(12) United States Patent
Otsubo et al.

(10) Patent No.: US 11,620,406 B2
(45) Date of Patent: Apr. 4, 2023

(54) INFORMATION PROCESSING DEVICE, INFORMATION PROCESSING METHOD, AND RECORDING MEDIUM

(71) Applicant: NS Solutions Corporation, Tokyo (JP)

(72) Inventors: Masanori Otsubo, Tokyo (JP); Takuma Hatano, Tokyo (JP)

(73) Assignee: NS SOLUTIONS CORPORATION, Tokyo (JP)

( * ) Notice: Subject to any disclaimer, the term of this patent is extended or adjusted under 35 U.S.C. 154(b) by 270 days.

(21) Appl. No.: 16/492,057

(22) PCT Filed: Nov. 29, 2017

(86) PCT No.: PCT/JP2017/042748
§ 371 (c)(1),
(2) Date: Sep. 6, 2019

(87) PCT Pub. No.: WO2018/168103
PCT Pub. Date: Sep. 20, 2018

(65) Prior Publication Data
US 2020/0034348 A1   Jan. 30, 2020

(30) Foreign Application Priority Data

Mar. 17, 2017 (JP) .............................. JP2017-053036

(51) Int. Cl.
*G06F 21/62* (2013.01)
(52) U.S. Cl.
CPC ................. *G06F 21/6254* (2013.01)

(58) Field of Classification Search
CPC .................................................. G06F 21/6254
See application file for complete search history.

(56) References Cited

U.S. PATENT DOCUMENTS

| 8,468,346 B2 | 6/2013 | Furukawa |
| 2004/0049517 A1* | 3/2004 | Singh .................. G06F 21/6254 707/999.102 |
| 2011/0202764 A1 | 8/2011 | Furukawa |

(Continued)

FOREIGN PATENT DOCUMENTS

| JP | 09-288658 A | 11/1997 |
| JP | 5293745 B2 | 9/2013 |

(Continued)

OTHER PUBLICATIONS

International Search Report and Written Opinion, issued by International Searching Authority in corresponding International Application No. PCT/JP2017/042748, dated Mar. 6, 2018.

(Continued)

*Primary Examiner* — Grace Park
(74) *Attorney, Agent, or Firm* — ArentFox Schiff LLP

(57) ABSTRACT

The present invention is configured to determine a replacement attribute as a replacement target of attribute values, from among a plurality of attributes of data including the attribute values of the plurality of attributes corresponding to each of a plurality of objects, and to replace the attribute values of the replacement attribute determined in the data, based on a useful index being an index of usefulness of the data and a replacement limitation being a limitation in replacement of the attribute values.

13 Claims, 7 Drawing Sheets

| ID | GENDER | ADDRESS | HEIGHT | WEIGHT |
|----|--------|---------|--------|--------|
| 1 | MALE | TOKYO | 170 | 75 |
| 2 | MALE | SAITAMA | 165 | 50 |
| 3 | MALE | TOKYO | 180 | 80 |
| 4 | MALE | CHIBA | 170 | 55 |
| 5 | FEMALE | CHIBA | 175 | 55 |
| 6 | FEMALE | TOKYO | 160 | 60 |
| 7 | FEMALE | SAITAMA | 150 | 40 |
| 8 | FEMALE | TOKYO | 155 | 55 |

(56) References Cited

U.S. PATENT DOCUMENTS

| | | | | |
|---|---|---|---|---|
| 2013/0239226 | A1* | 9/2013 | Miyakawa | H04L 63/0407 726/26 |
| 2013/0291128 | A1 | 10/2013 | Ito et al. | |
| 2014/0304244 | A1* | 10/2014 | Toyoda | G06F 16/2228 707/696 |
| 2015/0269391 | A1* | 9/2015 | Ukil | G06F 21/6254 726/30 |
| 2015/0339488 | A1 | 11/2015 | Takahashi | |
| 2016/0203334 | A1* | 7/2016 | Fawaz | H04L 63/0407 726/30 |
| 2017/0061156 | A1 | 3/2017 | Hamamoto et al. | |
| 2018/0004978 | A1* | 1/2018 | Hebert | G06F 21/6254 |

FOREIGN PATENT DOCUMENTS

| | | |
|---|---|---|
| JP | 2013-200659 A | 10/2013 |
| JP | 2014-241071 A | 12/2014 |
| JP | 2015-079403 A | 4/2015 |
| JP | 2016-184213 A | 10/2016 |
| JP | 2017-49693 A | 3/2017 |
| JP | 2017-073022 A | 4/2017 |
| JP | 2017-076170 A | 4/2017 |
| KR | 10-2012-0061335 A | 6/2012 |
| WO | WO 2013/027782 A1 | 2/2013 |

OTHER PUBLICATIONS

Takenouchi, Takao "k-Tokumeika gijyutsu to jitsuyoka ni muketa torikumi", Information Processing, vol. 54, No. 11, Nov. 2013, (Cited in Specification).

International Preliminary Report on Patentability issued from the International Bureau in counterpart International Application No. PCT/JP2017/042748, dated Sep. 26, 2019.

Communication from the European Patent Office in counterpart European Application No. 17900297.7, dated Dec. 8, 2020.

Communication issued by the Korean Intellectual Property Office in corresponding Korean Application No. 10-2019-7026989, dated Nov. 23, 2020.

* cited by examiner

FIG.1

| ID | GENDER | ADDRESS | ILLNESS |
|----|--------|---------|---------|
| 1 | MALE | TOKYO | HEADACHE |
| 2 | MALE | SAITAMA | BACKACHE |
| 3 | MALE | TOKYO | ASTHMA |
| 4 | MALE | CHIBA | ASTHMA |
| 5 | FEMALE | CHIBA | STOMACH ULCER |
| 6 | FEMALE | TOKYO | HEADACHE |
| 7 | FEMALE | SAITAMA | HEADACHE |
| 8 | FEMALE | TOKYO | HEADACHE |

FIG.2

| ID | GENDER | ADDRESS | ILLNESS |
|----|--------|---------|---------|
| 1 | MALE | TOKYO | HEADACHE |
| 2 | MALE | SAITAMA | ASTHMA |
| 3 | MALE | TOKYO | BACKACHE |
| 4 | MALE | CHIBA | ASTHMA |
| 5 | FEMALE | CHIBA | HEADACHE |
| 6 | FEMALE | TOKYO | STOMACH ULCER |
| 7 | FEMALE | SAITAMA | HEADACHE |
| 8 | FEMALE | TOKYO | HEADACHE |

FIG.5

| ID | GENDER | ADDRESS | HEIGHT | WEIGHT |
|---|---|---|---|---|
| 1 | MALE | TOKYO | 175 | 75 |
| 2 | MALE | SAITAMA | 160 | 50 |
| 3 | MALE | TOKYO | 180 | 80 |
| 4 | MALE | CHIBA | 170 | 55 |
| 5 | FEMALE | CHIBA | 170 | 55 |
| 6 | FEMALE | TOKYO | 165 | 60 |
| 7 | FEMALE | SAITAMA | 150 | 40 |
| 8 | FEMALE | TOKYO | 155 | 55 |

FIG.6

| SHUFFLE ID | SHUFFLE TARGET |
|---|---|
| 1 | HEIGHT |
| 2 | WEIGHT |

FIG.7

| INDEX ID | USEFUL INDEX |
|---|---|
| 1 | DIFFERENCE OF AVERAGE HEIGHT FOR EACH GENDER BEFORE AND AFTER REPLACEMENT OF ATTRIBUTE VALUES |
| 2 | DIFFERENCE OF AVERAGE HEIGHT FOR EACH ADDRESS BEFORE AND AFTER REPLACEMENT OF ATTRIBUTE VALUES |
| 3 | DIFFERENCES OF AVERAGE WEIGHT FOR EACH GENDER AND FOR EACH ADDRESS BEFORE AND AFTER REPLACEMENT OF ATTRIBUTE VALUES |

FIG.8

|   | 1 | 2 | 3 | 4 | 5 | 6 | 7 | 8 |
|---|---|---|---|---|---|---|---|---|
| 1 | 0 | 0 | 0 | 0 | 1 | 0 | 0 | 0 |
| 2 | 0 | 0 | 0 | 0 | 0 | 1 | 0 | 0 |
| 3 | 0 | 0 | 1 | 0 | 0 | 0 | 0 | 0 |
| 4 | 0 | 0 | 0 | 1 | 0 | 0 | 0 | 0 |
| 5 | 1 | 0 | 0 | 0 | 0 | 0 | 0 | 0 |
| 6 | 0 | 1 | 0 | 0 | 0 | 0 | 0 | 0 |
| 7 | 0 | 0 | 0 | 0 | 0 | 0 | 1 | 0 |
| 8 | 0 | 0 | 0 | 0 | 0 | 0 | 0 | 1 |

FIG.9

| ID | GENDER | ADDRESS | HEIGHT | WEIGHT |
|----|--------|---------|--------|--------|
| 1 | MALE | TOKYO | 170 | 75 |
| 2 | MALE | SAITAMA | 165 | 50 |
| 3 | MALE | TOKYO | 180 | 80 |
| 4 | MALE | CHIBA | 170 | 55 |
| 5 | FEMALE | CHIBA | 175 | 55 |
| 6 | FEMALE | TOKYO | 160 | 60 |
| 7 | FEMALE | SAITAMA | 150 | 40 |
| 8 | FEMALE | TOKYO | 155 | 55 |

FIG.10

|   | 1 | 2 | 3 | 4 | 5 | 6 | 7 | 8 |
|---|---|---|---|---|---|---|---|---|
| 1 | 0 | 1 | 0 | 0 | 0 | 0 | 0 | 0 |
| 2 | 0 | 0 | 1 | 0 | 0 | 0 | 0 | 0 |
| 3 | 1 | 0 | 0 | 0 | 0 | 0 | 0 | 0 |
| 4 | 0 | 0 | 0 | 0 | 0 | 0 | 1 | 0 |
| 5 | 0 | 0 | 0 | 0 | 0 | 0 | 0 | 1 |
| 6 | 0 | 0 | 0 | 0 | 0 | 1 | 0 | 0 |
| 7 | 0 | 0 | 0 | 1 | 0 | 0 | 0 | 0 |
| 8 | 0 | 0 | 0 | 0 | 1 | 0 | 0 | 0 |

FIG.11

| CUSTOMER ID | GENDER | DATE | COUNTRY |
|---|---|---|---|
| 1 | f | 1960/12/25 | UK |
| 2 | m | 1957/5/15 | Iceland |
| 3 | f | 1947/2/19 | UK |

| CUSTOMER ID | DATE | PRODUCT | HISTORY ID |
|---|---|---|---|
| 1 | 2010/12/7 | RAMEN | 1 |
| 1 | 2010/12/7 | SOAP | 2 |
| 2 | 2011/1/18 | TOWEL | 3 |
| 3 | 2011/1/18 | DVD | 4 |

FIG.12

| CUSTOMER ID | GENDER | DATE | COUNTRY |
|---|---|---|---|
| 1 | f | 1960/12/25 | UK |
| 2 | m | 1957/5/15 | Iceland |
| 3 | f | 1947/2/19 | UK |

| CUSTOMER ID | DATE | PRODUCT |
|---|---|---|
| 3 | 2010/12/7 | RAMEN |
| 3 | 2010/12/7 | SOAP |
| 1 | 2011/1/18 | TOWEL |
| 2 | 2011/1/18 | DVD |

FIG.13

| CUSTOMER ID | GENDER | DATE | COUNTRY |
|---|---|---|---|
| 1 | f | 1960/12/25 | UK |
| 2 | m | 1957/5/15 | Iceland |
| 3 | f | 1947/2/19 | UK |

| CUSTOMER ID | DATE | PRODUCT | HISTORY ID |
|---|---|---|---|
| 3 | 2010/12/7 | RAMEN | 4 |
| 2 | 2010/12/7 | SOAP | 3 |
| 1 | 2011/1/18 | TOWEL | 2 |
| 1 | 2011/1/18 | DVD | 1 |

INFORMATION PROCESSING DEVICE, INFORMATION PROCESSING METHOD, AND RECORDING MEDIUM

CROSS-REFERENCE TO RELATED APPLICATIONS

The present application is a National Stage entry of International Application No, PCT/JP2017/042748, filed on Nov. 29, 2017, which claims priority to Japanese Patent Application No. 2017-053036, filed Mar. 17, 2017. The disclosures of the prior applications are incorporated by reference in their entirety.

TECHNICAL FIELD

The present invention relates to an information processing device, an information processing method, and a recording medium.

BACKGROUND ART

Recently, there are movements for analyzing data including information relating to an activity history of an object of an individual person and an organization such as a purchase record, a behavioral record, and the like, and utilizing the data in a business. This information has a high utility value, while includes possibilities of leakages such as privacy and a company secret. There is the technology, referred to as "anonymization", which prevents leakages of such information. For example, as one of the anonymization methods, there is a method of deleting directly identifiable attribute information (for example, name) for an individual person, from a database (DB) including such information.

CITATION LIST

Non Patent Literature

Non Patent Literature 1: Takenouchi, Takao "k-Tokumeika gijyutsu to jitsuyoka ni muketa torikumi", Information Processing, Vol. 54, No. 11, [searched on Feb. 14, 2018 (Heisei 29)], web address <URL http://id.nii.ac.jp/1001/00095363/>

SUMMARY OF INVENTION

Technical Problem

However, there remains a possibility of identifying an object from the other information, by only delating directly identifiable information for the object. As an anonymization method other than the deletion of the attribute information, there is the "k-anonymization" disclosed in NON-PATENT LITERATURE 1.

The "k-anonymization" is a method for performing anonymization by converting data having the same attribute value to be present k or more. This method can reduce the identifying possibility to 1/k or less.

If the database includes attribute values of each attribute for each individual person for example, target data having a plurality of personal data do not include the attribute (name) but includes the attributes ("gender" and "age"), there is the possibility as described below. That is, if an attacker knows the age and the gender of each person in the information included in the target data, the attacker may identify which of the individual data each record of the target data corresponds to.

For example, it is assumed that the target data include the attribute values (age, gender) having the data (25 years old, male) and the data (27 years old, male). In this case, k-anonymization can be performed by setting the attribute values of the age attribute of the target data as the information (not age value) including the age belonging to 20's, 30's or the like. In this case, both the data (25 years old, male) and the data (27 years old, male) are set as the data (20's male) and the data (20's male). Therefore, it is difficult to identify an individual person because there are a plurality of data including the same age and the same gender. That is, the security improves. On the other hand, because the attribute value of age is changed, the data value (usefulness) lowers, and for example, an average age cannot be accurately calculated.

In this way, in NON-PATENT LITERATURE 1, as the anonymization, it is necessary to process many data so that the number of records having the same attribute value are converted into k or more records, and therefore usefulness of the data may significantly lower.

Solution to Problem

The information processing device of the present invention has a determiner configured to determine a replacement attribute as a replacement target of attribute values, from among a plurality of attributes of data including the attribute values of the plurality of attributes corresponding to each of a plurality of objects, and a replacer configured to replace the attribute values of the replacement attribute in the data determined by the determiner, based on a useful index being an index of usefulness of the data and a replacement limitation being a limitation in replacement of the attribute values.

Advantageous Effects of Invention

According to the present invention, both security and usefulness of data can be accomplished.

BRIEF DESCRIPTION OF DRAWINGS

FIG. 1 is a diagram illustrating one example of replacement of attribute values.

FIG. 2 is a diagram illustrating one example of replacement of attribute values.

FIG. 5 is a diagram illustrating one example of target data.

FIG. 6 is a diagram illustrating one example of replacement attribute.

FIG. 7 is a diagram illustrating one example of a useful index.

FIG. 8 is a diagram illustrating one example of a replacement pattern.

FIG. 9 is a diagram illustrating one example of target data after replacement of attribute values.

FIG. 10 is a diagram illustrating one example of a replacement pattern.

FIG. 11 is a diagram illustrating one example of target data.

FIG. 12 is a diagram illustrating one example of data after replacement of attribute values.

FIG. 13 is a diagram illustrating one example of data after replacement of attribute values.

DESCRIPTION OF EMBODIMENTS

Figure 3:
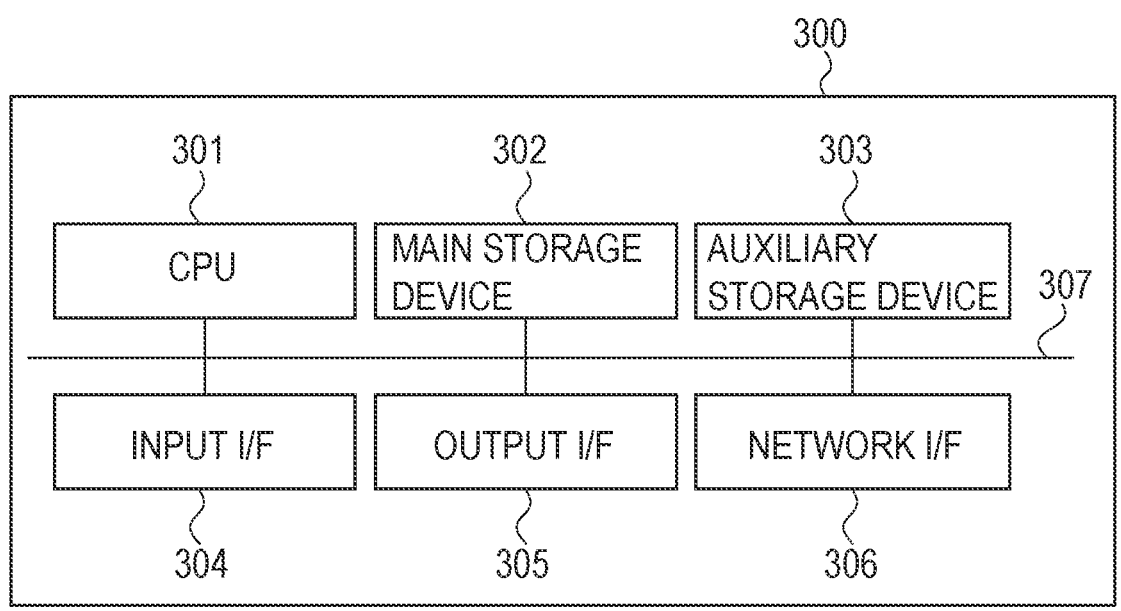
FIG. 3 is a diagram illustrating one example of a hardware configuration of an information processing device.

In the following description, the present embodiments of the present invention are described with reference to the drawings.

Embodiment 1

(Anonymization by Shuffle)

Regarding an anonymization method for data including attribute values of a plurality of attributes for each of a plurality of objects such as a person and an organization, there is a method referred to as "a shuffle". The shuffle is a method of replacing attribute values of an attribute for a replacement target of a target data at random. This may be difficult to identify which of the objects the information corresponds to.

Here, it is assumed that a certain attribute is grouped into a plurality of groups. It is assumed that the attribute values of the attribute for the replacement target are replaced at random between each of objects belonging to the same group. In this case, this method can maintain usefulness of the data for an amount of statistics of the attribute values of the group, regardless of replacement. The amount of statistics is a numerical number for indicating a statistical characteristic of data. The amount of statistics includes an average value, a variance value, a maximum value, a minimum value, a median value, a mode value and a standard variation.

FIGS. 1 and 2 are diagrams illustrating one example of replacement of attribute values within the same group in a shuffle. The table in FIG. 1 is a table showing the data including information such as an identification (ID), gender, an address, and an illness, for each individual person. Here, a group (male group) with the attribute values of the gender attribute being male and a group (female group) with the attribute values of the gender attribute being female are assumed to be set. It is assumed that the attribute values of the illness attribute of the table in FIG. 1 are replaced between objects belonging to the male group, and further are replaced between objects belonging to the female group.

The table in FIG. 2 is a table after the attribute values of the illness attribute of the table in FIG. 1 are replaced. It is known that the amounts of statistics regarding the illnesses in the male group and female group is not subject to replacement of the attribute values. In this way, the group is set for a certain attribute other than the replacement target attribute of the attribute value, and usefulness of data in the set group can be maintained by replacing the attribute values of the replacement target attribute between objects belonging to the set group.

However, since an amount of statistics of an illness for each attribute (for example, an address) other than the attributes in which the group is set, is subject to replacement of attribute values, usefulness of the data lowers. In addition, if the group is set for a set of the gender and the address, the amount of statistics of the illness for the address is not subject to the replacement, and therefore usefulness of the data can be improved. However, the number of objects belonging to the group to be set for the set of the gender and the address is less than the number of objects belonging to the set group for any one of the gender and the address. Therefore, the replacement for the attribute values cannot be sufficiently performed, and therefore the security lowers. Furthermore, as the attribute of the target increases for which the group is set, the number of the objects belonging to the group decreases. Therefore, it is difficult to replace the attribute values.

Therefore, in this embodiment, an information processing device 300 performs the following processing for data including a plurality of attributes correspondingly, and performs anonymization by accomplishing both the usefulness and the security of the data. That is, the information processing device 300 generates a replacement pattern of the attribute values of the attribute of the replacement target, judges whether or not a limitation for maintaining the security is satisfied for each generated replacement pattern, and obtains an index indicating the usefulness. Then, the information processing device 300 selects an optimum replacement pattern based on the index indicating usefulness to be obtained as the replacement pattern satisfying the limitation, and performs replacement processing for the attribute values of the replacement target attribute between objects in accordance with the replacement pattern to be selected. As one example of the data including the attribute values of the plurality of attributes corresponding to each of a plurality of objects, there is a table or a list including the attribute values of the plurality of attributes of the objects corresponding to a row for each row. As another example, a schema-less database such as a document orientation database may include data.

(Hardware Configuration of Information Processing Device)

FIG. 3 is a diagram illustrating one example of a hardware configuration of the information processing device 300. The information processing device 300 is an information processing device such as a personal computer (PC), a server device, and a tablet device.

The information processing device 300 includes a CPU 301, a main storage device 302, an auxiliary storage device 303, an input I/F 304, an output I/F 305, and a network I/F 306. Each element is connected communicatively to each other, via a system bus 307.

The CPU 301 is a central processing unit that controls the information processing device 300. In addition, the main storage device 302 is a storage device such as a Random Access Memory (RAM) that functions as a temporal storage region for a work area of the CPU 301 and various types of information. The auxiliary storage device 303 is a storage device configured with storage media such as a hard disk drive (HDD) that stores various types of programs, various types of information, various types of thresholds, data of an anonymization target, and the like. The auxiliary storage device 303 also stores a useful index information which is an index of usefulness of the data, a security index information which is an index of security of the data, information indicating the limitation in replacement of the attribute values, and the like. The auxiliary storage device 303 may be configured with a Read Only Memory (ROM), a solid state drive (SSD), and the like.

The input I/F 304 is an interface utilized in connection with an input device such as a mouse, a keyboard and a touch panel. The CPU 301 receives, via the input I/F 304, an input by a user through the input device. The output I/F 305 is an interface utilized in connection with an output device such as a display screen of a monitor, a display, and a touch panel. The CPU 301 outputs, via the output I/F 305, information and the like of the display screen, to the output device. The network I/F 306 is an interface utilized in communication with external devices via a network. The CPU 301 exchanges information, via the network I/F 306, between the external devices.

Figure 4:
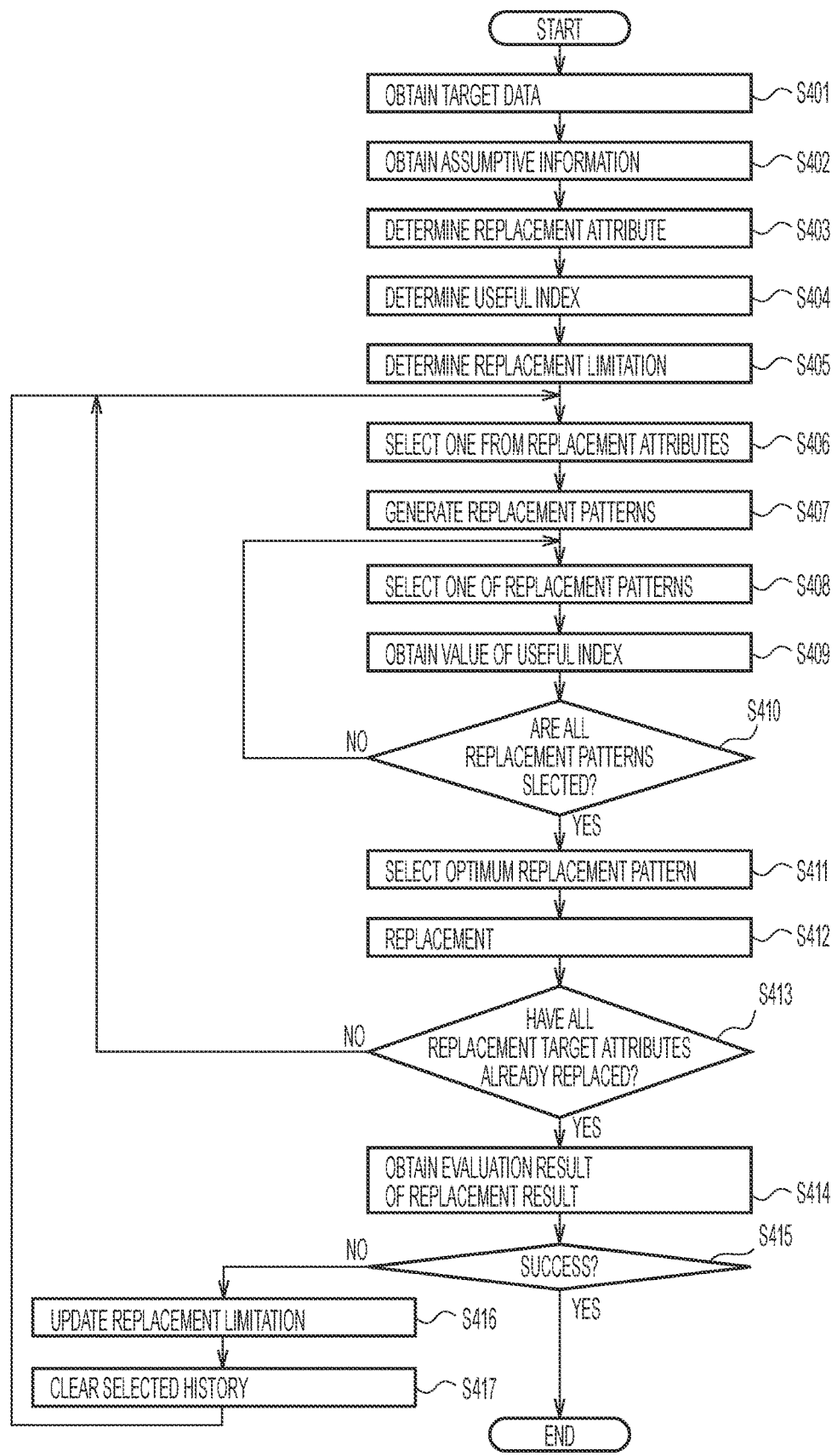
FIG. 4 is a flowchart illustrating one example of replacement processing of attribute values.

The CPU 301 executes processing based on a program stored in the auxiliary storage device 303, and therefore a function of the information processing device 300, and the processing of the flowchart after-mentioned in FIG. 4 are realized.

(Replacement Processing of Attribute Value)

FIG. 4 is a flowchart illustrating one example of replacement processing of attribute values of the information processing device 300. With reference to FIG. 4, the processing of the anonymization method for data in this embodiment is described.

At S401, the CPU 301 obtains the data of the anonymization target. The CPU 301 obtains, for example, the data of the anonymization target previously stored in the auxiliary storage device 303. The CPU 301 may also obtain the data of the anonymization target stored in an external HDD, an external USB memory, and the like. In addition, the CPU 301 may obtain the data of the anonymization target sent from the external device, via the network I/F 306. The CPU 301 may also receive an input of the data of the anonymization target, based on a user operation via the input device connected to the input I/F 304. In the following description, the data of the anonymization target obtained at S401 are set as a target data.

In this embodiment, it is assumed that the CPU 301 obtains data of the table shown in FIG. 5 as the target data at S401. As shown in FIG. 5, each row of the target data includes information about a person corresponding to that row. The target data include attributes such as an identification (ID), gender, an address, a height, and a weight.

The CPU 301 stores the information of the target data obtained at S401 as shown in FIG. 5, in the main storage device 302. The CPU 301 reads and uses the information of the target data from the main storage device 302.

At S402, the CPU 301 obtains information assumed to be known by an attacker from among the information included in the target data obtained at S401. The attacker is a person who performs an operation of the target data for nefarious purposes such as reading information for fraudulent purposes. The attacker is one example of a viewer who browses the target data. In the following description, the information assumed to be known by the attacker among the information included in the target data is considered as an assumptive information. The CPU 301 obtains, for example, the assumptive information previously stored in the auxiliary storage device 303. The CPU 301 may also obtain the assumptive information stored in the external HDD, the external USB memory and on the like. In addition, the CPU 301 may obtain the assumptive information sent from the external device, via the network I/F 306. The CPU 301 may also receive an input of the assumptive information, based on the user operation via the input device connected to the input I/F 304.

The assumptive information includes, for example, information indicating the attribute assumed that the attribute values of each object of the information included in the target data among the attributes included in the target data are known by the attacker, information indicating a rate of each object assumed to be known by the attacker among objects of the information included in the target data, and the like. In this embodiment, the CPU 301 obtains, as the assumptive information, the information of the attribute in which the attribute values of each object of the information included in the target data among the attributes included in the target data are known by the attacker. In this embodiment, it is assumed that the attacker knows the attribute values of the height and the weight of each object of the information included in the target data. That is, the CPU 301 obtains, as the assumptive information, the information indicating the attributes of the height and the weight. In addition, the assumptive information may include the information of the object assumed that the information of these attributes is known by the attacker. The assumptive information includes, for example, information indicating that the attributes of the height and the weight of an object A and an object B among the all objects are assumed to be known by the attacker.

At S403, the CPU 301 determines the attribute of the replacement target of the attribute values among the attributes included in the target data. In the following description, it is assumed that the attribute of the replacement target of the attribute values is a replacement attribute.

The attacker knows the attribute values of the height and the weight of each object. Therefore, if the object is uniquely set based on a combination of the attribute values of the attributes of the height and the weight of the target data, the attacker can identify the row corresponding to the object. That is, the attacker can identify the information of the address, the gender, and identification (ID) of each object. The CPU301 replaces the attribute values of the attribute included in the attribute of which the attribute value corresponding to each object is known by the attacker, and therefore does not cause the attacker to identify the data of which of the objects each information of the target data corresponds to.

The CPU301 determines, as the replacement attribute, each of the height attribute and the weight attribute indicated by the assumptive information obtained at S402. The CPU301 may also determine, as the replacement attribute, any one of the height attribute and the weight attribute indicated by the assumptive information obtained at S402. The CPU301 may also determine, as the replacement attribute, a set of the height attribute and the weight attribute indicated by the assumptive information obtained at S402. The CPU 301 may also determine the replacement limitation after-mentioned in the description of S405, based on the information indicating the rate of the object assumed to be known by the attacker, indicated by the assumptive information obtained at S402.

The CPU 301 may also receive a designation of the attribute, based on the user operation via the input device connected to the input I/F 304, and determine the received attribute, as the replacement attribute. For example, the CPU 301 may determine the address attribute as the replacement attribute, if the user designates the address attribute. In addition, if the auxiliary storage device 303 and the like previously stores the information indicating that which of the attribute of the target data is set as the replacement attribute in a format such as a config file, the CPU 301 may obtain that information from the auxiliary storage device 303, and determine, as the replacement attribute, the attribute indicated by the obtained information.

The CPU 301 stores the information of the replacement attribute determined at S403, in the main storage device 302 and the like, as a table shown in FIG. 6. The CPU 301 reads and uses the information of the replacement attribute from the main storage device 302.

In this embodiment, it is assumed that the CPU 301 determines, as the replacement attribute, the height and the weight.

At S404, the CPU 301 determines the index indicating the usefulness of the target data. In the following description, it is assumed that the index indicating the usefulness of the target data is a useful index. The CPU 301 obtains, for example, the information indicating the index previously stored in the auxiliary storage device 303, and determines the index indicated by the obtained information, as the useful index. The CPU 301 may also obtain the information indicating the index stored in the external HDD, the external USB memory, and the like, and determine the index indicated by the obtained information, as the useful index. The CPU 301 may also obtain the information indicating the index sent from the external device via the network I/F 306, and determine the index indicated by the obtained information, as the useful index. The CPU 301 may also receive the input of the useful index, based on the user operation via the input device connected to the input I/F 304.

The CPU 301 stores the information of the useful index determined at S404, in the main storage device 302. The CPU 301 reads and uses the information of the useful index from the main storage device 302.

The useful index includes a difference between a feature amount extracted from the target data and the same feature amount extracted from the target data after replacement of the attribute values, for example. The useful index of this difference is an index indicating that, as the index decreases, the difference to the target data is small and that the usefulness of the target data after replacement of the attribute values is high. The feature amount extracted from the target data include an amount of statistics of an average value and the like of the attribute values for each of a plurality of groups to be set for a certain attribute.

More specifically, as shown in FIG. 7, the useful index includes a difference between an average height for each gender extracted from the target data and an average height for each gender extracted from the target data after replacement of the attribute values, for example. The useful index also includes a difference between an average height for each address extracted from the target data and an average height for each address extracted from the target data after replacement of the attribute values, for example. The useful index also includes a difference between an average weight for each gender and for each address extracted from the target data and an average weight for each gender and for each address extracted from the target data after replacement of the attribute values, for example.

In this embodiment, it is assumed that at S404, the CPU 301 determines each index shown in FIG. 7, as the useful index.

At S405, the CPU 301 determines a limitation in replacement of the attribute values. In the following description, it is assumed that the limitation in replacement of this attribute value is a replacement limitation. The replacement limitation includes, for example, a limitation such as a rule that should be obeyed in processing for replacement of the attribute values, and a rule of prohibiting a certain thing in processing for replacement of the attribute values. The replacement limitation may also include a limitation of generating a penalty value in replacement of the attribute values. The penalty value is a value of the security index or the useful index of the target data.

The CPU 301 obtains, for example, the information indicating the limitation previously stored in the auxiliary storage device 303, and determines the limitation indicated by the obtained information, as the replacement limitation. The CPU 301 may also obtain the information indicating the limitation stored in the external HDD, the external USB memory, and the like, and determine the limitation indicated by the information to be obtained, as the replacement limitation. The CPU 301 may also obtain the information indicating the limitation sent from the external device via the network I/F 306, and determine the limitation indicated by the obtained information, as the replacement limitation. The CPU 301 may also receive the input of the replacement limitation, based on the user operation via the input device connected to the input I/F 304.

The replacement limitation includes, for example, a limitation for a distance between the target data before replacement of the attribute values and the target data after replacement of the attribute values. The distance between the target data before and after replacement of the attribute values is an index indicating how much the target data before replacement and target data after replacement are different each other. As one example of this distance, a minimum value of the number of times in the replacement operation between any two objects required for executing replacement of the attribute values is considered. The replacement operation is assumed as an operation of replacing a certain attribute value with another attribute value. In addition, as one example of this distance, the number of the attribute values not being replaced in replacement of the attribute values and the number of the attribute values being replaced in replacement of the attribute values are considered. Additionally, as one example of this distance, a rate of the number of the attribute values not being replaced in replacement of the attribute values to the total number of the attribute values, and a rate of the number of the attribute values being replaced in replacement of the attribute values to the total number of the attribute values, and the like are considered.

For example, the replacement limitation includes a limitation indicating that an attribute value without replacement among the attribute values of the replacement target attribute is not generated (for example, the number of the attribute values without replacement is set to be 0) and a limitation indicating that the attribute value without replacement among the attribute values of the replacement target attribute is not generated with a setting threshold value (for example, 50% etc.) or more. The replacement limitation also includes a limitation indicating that the minimum number of times in the replacement operation in the attribute value performed in replacement of attribute values of the replacement attribute is set to be a setting threshold value (for example, four times) or more.

The replacement limitation also includes a limitation indicating that the attribute values are replaced between objects belonging to different groups. This group indicates a collection of objects having a certain common characteristic. For example, as an index of a gender attribute, the groups (male group, female group) having a common attribute value are set. In addition, groups may be set as a plurality of indices. For example, a set of the attribute values of the gender and the address may be set as the identical groups (for example, groups of (Tokyo, Male), (Tokyo, Female), (Chiba, Male), and (Chiba, Female)). In addition, a plurality of groups to be set with different indices may be set. For example, a group with the attribute values of the attribute of the gender having a common value, and a group with the set of the attribute values of the gender and the address being identical may be set. In addition, a group may be set based on the useful index. More specifically, a group may be set based on an attribute (for example, "gender") classable into a plurality of groups among the attributes of the feature amount used in calculating the useful index.

The replacement limitation also includes a limitation indicating that the attribute value with a setting threshold value (for example, 50% etc.) or more among the attribute values of the replacement target attribute are replaced between objects belonging to different groups. The replacement limitation also includes a limitation indicating that the attribute value with the replacement operation of the attribute values being performed between objects belonging to the same group is set to be less than a setting threshold value (for example, 50% etc.) among the attribute values of the replacement target attribute. In addition, these threshold values may be set based on the information indicating the rate of the object with the corresponding attribute value assumed to be known by the attacker, indicated by the assumptive information. In this way, the CPU 301 may determine these threshold values based on the assumptive information, and determine the replacement limitation.

The replacement limitation also includes a limitation of prohibiting no generation of the replacement for the attribute values of any attribute of the replacement target of each object and the like.

In this manner, a limitation for increasing the number of the attribute values to be replaced, or a replacement limitation for increasing the number of the attribute values to be replaced between objects belonging to different groups is one example of a limitation of assuring data security. The replacement limitation may be a limitation of assuring the data usefulness. The replacement limitation of assuring the data usefulness includes a replacement limitation for decreasing the number of the attribute values to be replaced, and a replacement limitation for decreasing the number of the attribute values to be replaced between objects belonging to different groups.

The replacement limitation also includes a limitation indicating that a penalty value is generated which is the security index depending on the distance between the target data before replacement of the attribute values and the target data after replacement of the attribute values. For example, the replacement limitation includes a limitation indicating that a penalty value is generated depending on the number of the attribute values not being replaced among the attribute values of the attributes of the replacement target. The plurality of limitations of above limitations may also be a replacement limitation. In the following description, the penalty value being the index of security is assumed as a security index.

The security index includes, for example, the number of the attribute values with the replacement operation not being performed among attribute values of the replacement attribute, and the number of the attribute values with the replacement operation being replaced among attribute values of the replacement attribute. The security index also includes, for example, the rate of the number of the attribute values with the replacement operation not being performed among attribute values of the replacement target attribute to the total number of the attribute values of the attribute, and the rate of the number of the attribute values with the replacement operation being replaced among attribute values of the replacement target attribute to the total number of the attribute values of the attribute. The security index also includes the total number of times in the replacement operation of the attribute values, the number of the attribute values, among the attribute values of the replacement attribute, with one to one replacement operation being performed the number of the attribute values with the replacement operation being performed in the same group among the setting groups, the number of the attribute values with the replacement operation being performed between the different groups among the setting groups, and the like. The security index also includes the rate of the number of the attribute values with the replacement operation being performed in the same group among the setting groups to the total number of the attribute values, and the rate of the number of the attribute values with the replacement operation being performed between the different groups among the setting groups to the total number of the attribute values. In addition, a value derived by multiplying each of the above these values by a coefficient to be previously set and the like may be the security index. The plurality of security indices of above security indices may also be the security index.

If the CPU 301, by the replacement limitation, obtains the security index as the penalty value in processing of replacement of the attribute values, the CPU 301 determines the optimum replacement pattern from among a plurality of replacement patterns, based on the useful index mentioned below at S409, and the security index to be obtained.

As the replacement operation of the attribute values increases, it is difficult to identify which of the objects each row of the target data corresponds to. The CPU 301 limits the security index to a proper value, as the security index indicating the minimum number of times in the replacement operation of the attribute values being performed, and it is difficult to identify which of the objects each row of the target data corresponds to, and therefore the CPU 301 can improve the security.

The object corresponding to the row with one to one replacement of the attribute values being performed is easy to be identified rather than the row with the other attribute values being replaced. The CPU 301 limits the security index to a proper value, as the security index being set as the number of the attribute values in which the one to one replacement of the attribute values is performed, and it is difficult to identify which of the objects each row of the target data corresponds to, and therefore the CPU 301 can improve the security.

As replacement of the attribute values increases which is performed between different groups (for example, between male group and female group) to be set for the attribute included in the target data, it is difficult to identify which of the objects each row of the target data corresponds to. The CPU 301 limits the security index to a proper value, as the security index being set as the number of the attribute values in which the replacement is performed between the identical groups, and it is difficult to identify which of the objects each row of the target data corresponds to, and therefore the CPU 301 can improve the security.

In this embodiment, it is assumed that at S405, the rate of the number of the attribute values not being replaced among the attribute values of the replacement target attribute to the total number of the attribute values of the attribute is determined as the security index.

At S406, the CPU 301 selects one from the replacement attributes determined at S403. In the following description, the attribute selected at S406 is assumed as a selective attribute. The CPU 301 stores, as the selective attribute, history information indicating that the selected attribute has already been selected as the selective attribute, in the main storage device 302. The CPU 301 can identify the unselective replacement attribute with reference to this history information. In this embodiment, it is assumed that the CPU 301 selects, as the selective attribute, the height attribute, if the CPU 301 performs the processing at S406 firstly.

At S407, the CPU 301 generates the replacement pattern of the attribute values of the selective attribute for the target data obtained at S401. In this embodiment, the CPU 301 generates the all replacement patterns of the attribute values of the selective attribute.

FIG. 8 is a diagram illustrating one example of a replacement pattern. With reference to FIG. 8, the replacement pattern generated at S407 is described.

The table in FIG. 8 shows the replacement pattern which is information indicating the correspondence relation of replacement of the attribute values, in a tabular form. In the example of FIG. 8, the items (1 to 8) of rows of the table shows ID before replacement of the attribute values of the replacement target. The items (1 to 8) of columns of the table also shows ID after replacement of the attribute values of the replacement target.

"1" in the table shows each of replacement of the replacement values. The attribute value corresponding to ID shown in the row corresponding to "1" in the table is to be changed to the attribute value corresponding to ID shown in the columns corresponding to "1". The sum of each row or each column of the replacement pattern is 1, respectively. In the example of FIG. 8, the attribute values of the original ID 3, 4, 7, and 8 are also set to be 3, 4, 7, and 8 after change respectively, that is, replacement is not performed. In the example of FIG. 8, the one to one replacement is to be performed between the attribute value of ID1 and the attribute value of ID5, and between the attribute value of ID2 and the attribute value of ID6, respectively. In the example of FIG. 8, it is shown that the replacement operation has been performed at least once between the attribute value of ID1 and the attribute value of ID5, at least once between the attribute value of ID2 and the attribute value of ID6, that is, a total of at least two replacement operations of the attribute values have been performed. In addition, the number of the attribute values whose replacement is performed, becomes four identifications (ID1, ID2, ID5, and ID6). Additionally, the number of the attribute values not being replaced, becomes four identifications (ID3, ID4, ID7, and ID8).

At S408, the CPU 301 selects one from the replacement patterns which are generated at S407. In the following description, the replacement pattern selected at S408 is assumed as a selective pattern.

At S409, the CPU 301 obtains, for the selective pattern, the value of the useful index which is determined at S404. FIG. 9 is a diagram illustrating one example of target data after replacement of attribute values indicated by the replacement pattern in FIG. 8. As shown in FIG. 9, compared with the table in FIG. 5, it is found that the attribute values of the height attribute are replaced between the attribute value of ID1 and the attribute value of ID5. It is also found that the attribute values of the height attribute are replaced between the attribute value of ID2 and the attribute value of ID6.

The CPU 301 obtains the useful index based on the target data after replacement of attribute values of the selective attribute indicated by the selective pattern. The selective attribute is assumed as a height. The useful indices for the height are assumed as the useful index (1) and the useful index (2) as described below. The useful index (1) is a difference between an average height for each gender extracted from the target data and an average height for each gender extracted from the target data after replacement of the attribute values. Also, the useful index (2) is a difference between an average height for each address extracted from the target data and an average height for each address extracted from the target data after replacement of the attribute values.

The average height of the male group in the target data before replacement of the attribute values of the height shown in FIG. 5 is (175+160+180+170)/4=171.25. The average height of the male group in the target data after replacement of the attribute values of the height shown in FIG. 9 is (175+165+180+170)/4=171.25.

The average height of the female group in the target data before replacement of the attribute values of the height shown in FIG. 5 is (170+165+150+155)/4=160. The average height of the female group in the target data after replacement of the attribute values of the height shown in FIG. 9 is (175+160+150+155)/4=160.

Therefore, the useful index (1) is |171.25−171.25|+|160−160|=0.

The average height of the Tokyo group (whose address is Tokyo) in the target data before replacement of the attribute values of the height shown in FIG. 5 is (175+180+165+155)/4=168.75. The average height of the Tokyo group in the target data after replacement of the attribute values of the height shown in FIG. 9 is (170+180+160+155)/4=166.25.

The average height of the Chiba group (whose address is Chiba) in the target data before replacement of the attribute values of the height shown in FIG. 5 is (170+170)/2=170. The average height of the Chiba group in the target data after replacement of the attribute values of the height shown in FIG. 9 is (170+175)/2=172.5.

The average height of the Saitama group (whose address is Saitama) in the target data before replacement of the attribute values of the height shown in FIG. 5 is (160+150)/2=155. The average height of the Saitama group in the target data after replacement of the attribute values of the height shown in FIG. 9 is (165+150)/2=157.5.

Therefore, the useful index (2) is |166.25−168.75|+|172.5−170|+|157.5−155|=7.5.

Then, the CPU 301 calculates, for example, the sum of the useful index (1) and the useful index (2) as the final useful index for the selective pattern.

In this embodiment, at S409, the CPU 301 further determines whether or not the replacement limitation determined at S405 is satisfied.

In this embodiment, the replacement limitation which is determined at S405 is assumed as a limitation that the number of attribute values not being replaced among the attribute values of the replacement target attribute is set to be 50% or less of the entire attribute value.

The CPU 301 determines whether or not the replacement limitation is satisfied for the replacement pattern in FIG. 8. As shown in FIGS. 8 and 9, the objects with attribute values not being replaced among all objects indicated by ID1 to ID8 are four objects with ID3, ID4, ID7, and ID8. The number of the objects is eight, and therefore the number of the attribute values whose replacement being not performed is 4/8*100=50(%) of the entirety. Therefore, the CPU 301 determines that the replacement limitation is satisfied, because the number of the attribute values not being replaced is 50(%) or less of the entire attribute value.

In the example in FIG. 4, the groups (male group, female group) are assumed to be set for the gender attribute. Here, in the replacement pattern in FIG. 8, it is shown that the height attribute value of ID1 is replaced with the height attribute value of ID5. Here, the object of ID1 belongs to the male group, and the object of ID5 belongs to the female group. Therefore, the replacement of the height attribute value between ID1 and ID5 is considered as replacement of the attribute values to be performed between different groups. Similarly, the replacement of the height attribute value between ID2 and ID6 is considered as replacement of the attribute values to be performed between different groups.

At S410, the CPU 301 determines whether or not all the replacement patterns generated at S407 are selected at S408. If the CPU 301 determines that all the replacement patterns generated at S407 are selected at S408, the process proceeds to the processing at S411. If the CPU 301 determines that there is an unselective replacement pattern at 408, the process proceeds to the processing at S408.

At S411, the CPU 301 selects the optimum replacement pattern from the replacement patterns generated at S407, based on the value of the useful index which is obtained at S409 for each of the replacement pattern generated at S407, and the determination result whether or not the replacement limitation is satisfied at S409. For example, the CPU 301 identifies the useful index which is obtained for the replacement pattern for which the replacement limitation is determined to be satisfied. The replacement pattern for which the replacement limitation is determined to be satisfied, is one example of intermediate candidates. Then, the CPU 301 selects, as the optimum replacement pattern, a replacement pattern corresponding to the minimum value among the identified useful indices. However, if the useful index increases as the usefulness increases, the CPU 301 may select, as the optimum replacement pattern, a replacement pattern corresponding to the maximum value of the obtained useful index.

In this embodiment, at S407, the CPU301 generates all the replacement patterns. However, at S407, the CPU 301 may generate only the replacement pattern satisfying the replacement limitation.

Additionally, in this embodiment, the CPU 301 determines whether or not the replacement limitation is satisfied for each replacement pattern. However, the CPU 301 may obtain the useful index at S409, only in the case where the replacement pattern selected at S408 satisfies the replacement limitation.

In this case, at S411, the CPU 301 selects the replacement pattern corresponding to the minimum value among the useful indices obtained at S409, and therefore selects the optimum replacement pattern.

In addition, in the case where the replacement limitation is a limitation which generates the security index, at S409, the CPU 301 may obtain not only a value of the useful index of the replacement pattern but also the security index (for example, the number of the attribute values not being replaced). In this case, at S411, the CPU 301 may determine the optimum replacement pattern based on the value of the useful index and the value of the security index. The CPU 301 may determine, as the optimum replacement pattern, for example, the minimum value of the useful index among the replacement patterns with the value of the security index being the setting threshold value or less. The CPU 301 may also determine, as the optimum replacement pattern, for example, the minimum value of the security index among the replacement patterns with the value of the useful index being the setting threshold value or less. The CPU 301 may also determine, as the optimum replacement pattern, for example, the minimum value of values added to the useful index value after a predetermined weighting is performed for a value of the security index.

At S407, the CPU 301 may also set the replacement limitation as the limitation condition, and select the replacement pattern in which the value of the useful index being an objective function is minimized, using a publicly known optimization method. The publicly known optimization method includes, for example, an integer program solver, which is a software that solves an integer program problem. In this case, the CPU 310 may set a replacement flag to each object for the replacement pattern, and determine, based on the replacement flag, whether or not the replacement limitation is satisfied. The table in FIG. 8 is one example of the setting of the above replacement flag. The CPU 310 can effectively determine the optimum replacement pattern by the replacement flag, using the publicly known optimization method.

At S412, the CPU301 replaces the attribute values of the replacement attribute selected at S406 for the target data obtained at S401, according to the optimum replacement pattern determined at S411.

At S413, the CPU 301 determines whether or not all the replacement attributes determined at S403 is selected at S406. If the CPU 301 determines that all the replacement attributes determined at S403 is selected at S406, the process proceeds to the processing at S414. If the CPU 301 determines that there is an unselective attribute among the replacement attributes determined at S403, the process proceeds to the processing at S406.

In this embodiment, replacement of the attribute values of the height attribute are performed in each processing of first S407 to S412. Then, in the second processing of S406, the weight attribute is selected as the selective attribute. In the second processing of S407 to S412, the attribute values of the weight attribute are replaced.

In the first processing at S411, the replacement pattern in FIG. 8 is assumed to be selected as the optimum replacement pattern of the attribute values of the height.

It is assumed that the limitation included in the replacement limitation determined at S405 includes a limitation that the number of the objects with the attribute values for all the replacement attributes not being replaced is set to be 0.

In this case, the CPU 301 performs the following processing, in the processing at S409 for the weight attribute. The CPU 301 identifies the object ID not being replaced in the replacement pattern in FIG. 8, which is the replacement pattern of the attribute values of the height. The CPU 301 determines whether or not replacement of the attribute values corresponding to all the identified IDs is included in the replacement indicated by the selective pattern. Then, if it is determined to be included, the CPU 301 determines that the selective pattern satisfies the replacement limitation when this replacement satisfies the other limitations included in the other replacement limitations. Also, if it is determined not to be included, the CPU 301 determines that the selective pattern does not satisfy the replacement limitation. Thereby, the CPU 301 can prevent the attribute value not being replaced in all the replacement attributes (height attribute, weight attribute) from occurring, and improve the security for the target data after anonymization.

FIG. 10 is one example of a replacement pattern. It is found that the attribute value not being replaced in the replacement pattern in FIG. 8 has been replaced in the example in FIG. 10.

In addition, it is found that the replacement operation not being the one to one replacement operation has been performed among attribute values of ID1 to ID3 of the replacement pattern in FIG. 10. Among ID1 to ID3, for example, the replacement operation of the attribute values is performed once between the attribute value of ID1 and the attribute value of ID2, and thereafter is performed once between the attribute value of ID1 and the attribute value of ID3, that is, a total of at least two replacement operations of the attribute values are performed. In addition, the one to one replacement is each performed between the attribute value of ID4 and the attribute value of ID7. Therefore, the replacement operation of the attribute values is performed at least once between the attribute value of ID4 and the attribute value of ID7. The replacement operation of the attribute values is also performed at least once between the attribute value of ID5 and the attribute value of ID8. In addition, as for the attribute value of ID6, the replacement operation is not performed. In the example of FIG. 10, it is shown that a total of at least four replacement operations of the attribute values have been performed. In addition, the number of the attribute values whose replacement is performed becomes seven identifications (ID1, ID2, ID3, ID4, ID5, ID7, and ID8). Also, the number of the attribute values whose replacement being not performed, becomes one identification (ID6).

At S414, the CPU 301 obtains an evaluation result for a replacement result of the attribute values in the processing at S406 to S413. In this embodiment, as for the target data whose attribute values are replaced in the processing at S406 to S413, a test is performed which estimates which of the objects each row of the target data corresponds to. That is, the security test is performed for the replacement result.

For example, a program of an attacking application which is an application for estimating which of the objects each row of the target data corresponds to based on the attribute value of each row of the target data is assumed to be installed in the information processing device 300. In this case, for the target data whose attribute value being replaced, the attacking application performs processing which estimates which of the objects each row corresponds to. Then, the CPU 301 obtains the estimation result using the attacking application. The CPU 301 determines the evaluation result as success if the number of rows estimated by the attacking application to correspond to the correct object is less than the set threshold value. The CPU 301 also determines the evaluation result as fail if the number of rows estimated by the attacking application to correspond to the correct object is the set threshold value or more.

In this embodiment, the program of the attacking application is assumed to be installed in the auxiliary storage device 303 of the information processing device 300, while the program may also be installed in an external device. In this case, the attacking application included in the external device obtains information of the target data from the information processing device 300 via a network, and performs estimation processing for the obtained target data.

In addition, in the case where a test user performs a test which estimates which of the objects each row of the target data corresponds to, for the target data whose attribute values are replaced in the processing of S406 to S413, the CPU 301 may perform the following processing. That is, the CPU 301 receives an input of information indicating the evaluation result performed by the test user based on the user operation via the input device connected to the input I/F 304 to obtain the information indicating the evaluation result. The CPU 301 receives, for example, an input of the information indicating the estimation of how many rows of each row of the target data correspond to the correct object. The CPU 301 determines the evaluation result as success if the number of rows estimated by the test user to correspond to the correct object is less than the set threshold value. The CPU 301 also determines the evaluation result as fail if the number of rows estimated by the test user to correspond to the correct object is the set threshold value or more.

At S415, the CPU 301 determines whether or not the evaluation result obtained at S404 is success. If the CPU 301 determines that the evaluation result obtained at S404 is success, the CPU 301 ends the processing in FIG. 4. If the CPU 301 determines that the evaluation result obtained at S404 is not success, the process proceeds to the processing at S416.

At S416, the CPU 301 updates the replacement limitation. For example, the CPU 301 updates the replacement limitation so as to further improve the security, because the security is still insufficient when the security evaluation is performed at S414. For example, the CPU 301 updates the replacement limitation as the following description if the original replacement limitation is a limitation indicating that the number of attribute values being not replaced among the attribute values of the attribute of the replacement target of the attribute values is set to be 50% or less of the entire attribute value. The CPU 301 updates the replacement limitation, for example, to the limitation so that the number of the attribute values being not replaced among the attribute values of the attribute of the replacement target of the attribute values is set to be 0% or less of the entire attribute value. The CPU 301 may also update the replacement limitation, for example, to the limitation indicating that the number of the attribute values being not replaced is set to be 40% or less (or a value smaller than 50%, such as 30%) of the entire attribute value.

In such a way, the CPU 301 updates the replacement limitation, replaces the attribute values again, and therefore the CPU 301 can maintain the security of the target data after replacement of the attribute values at the proper level.

At S417, the CPU 301 clears the history information indicating the history selected at S406. Thereby, each of the replacement attributes determined at S403 becomes an unselective state at S406.

(Effect)

As described above, in this embodiment, the information processing device 300 replaces the attribute values of the attribute of the replacement target of the attribute values, for target data of anonymization, based on a useful index being an index of usefulness of the data and a replacement limitation in replacement of attribute values. More specifically, the information processing device 300 selects the optimum value of the useful index with the replacement limitation being satisfied among the replacement patterns of the attribute values, and replaces the attribute values in accordance with the selected replacement pattern. Thereby, the information processing device 300 can accomplish both usefulness and security of the target data after anonymization.

The information processing device 300 also selects the replacement attribute, from the attributes which are assumed that the attribute value corresponding to each object among the target data has been known by the attacker. Thereby, the information processing device 300 can inhibit the attacker from identifying which of the objects each row of the target data corresponds to.

The information processing device 300 can also provide the following effect by replacing the attribute values of the attribute of the replacement target of the attribute values, between the different groups. That is, in the case where the useful index is determined depending on an application of a data analysis, the information processing device 300 can prevent the attacker from estimating the replacement based on the application. For example, if anonymization is performed so as to preferably maintain a feature amount of physical data for each gender and age in order to analyze the physical data for each gender and age, the attacker may easily estimate the corresponding relation between objects in the replacement to be performed between data of the identical gender or between data of the identical age. Therefore, the information processing device 300 replaces attribute values between objects belonging to different groups, and therefore can further enhance the security.

In addition, in k-anonymization, each of the attribute values in the attribute converted into k attribute values is converted into any of the k attribute values. However, in the processing of this embodiment, the information processing device 300 replaces attribute values of the attribute of the replacement target, and does not convert the attribute values. Therefore, the information processing device 300 can decrease usage rate and the like of the CPU 301 according to the conversion of the attribute values.

(Modification)

In this embodiment, the CPU 301 obtains the evaluation result of security at S414, while the CPU 301 may obtain the evaluation result of usefulness. In this case, at S416, the CPU301 may change the useful index based on the evaluation result, and determine that the replacement limitation for the useful index is newly added. The usefulness evaluation includes, for example, an evaluation method of a difference between an amount of statistics calculated for the target data before replacement and an amount of statistics calculated for the target data after replacement, by calculating the amount of statistics of each attribute for the target data before replacement of the attribute values and the target data after replacement of the attribute values.

In this case, for example, if the difference is less than the set threshold value, the CPU 301 determines, as success, the evaluation result of the usefulness of the target data after replacement of the attribute values. For example, if the difference is the set threshold value or more, the CPU 301 determines, as fail, the evaluation result of the usefulness of the target data after replacement of the attribute values.

Then, if the evaluation result is fail, for example, the CPU 301 changes the useful index and replaces the attribute values again. If the evaluation result is fail, for example, the CPU 301 may also change the security index and the replacement limitation, and replace the attribute values again.

In this embodiment, the CPU 301 replaces the attribute values of the replacement attribute as the target data in a single table, and therefore performs anonymization. However, the CPU 301 can replace the attribute values of the replacement attribute, also for the target data that have the common attribute with each other and that are configured with a plurality of tables mutually associated based on this common attribute, and therefore can perform anonymization. The target data having the common attribute with each other and configured with a plurality of tables mutually associated based on this common attribute include a plurality of tables in which a relation in a relational database is set.

FIG. 11 is a diagram indicating one example of target data having the common attribute with each other and configured with a plurality of tables mutually associated based on this common attribute. In the following description, for the target data in FIG. 11, the processing in anonymization by replacement of attribute values is described. In FIG. 11, the left table is master data, and the right table is relation data. The relation data in FIG. 11 correspond to information indicating a purchase history of each customer. The attacker is assumed to retain information of the purchase history of each object. In this case, at 402, the CPU 301 obtains, as assumptive information, information about a set of a date attribute and a product attribute. Then, at S403, the CPU 301 determines, as the replacement attribute, a customer ID of the relation data including the attributes (the date and the product) included in the assumptive information.

Information of the purchase history of each customer is referred based on the customer ID of the master data. Therefore, by replacing the attribute values of the customer ID in the relation data, it can be difficult to accurately identify the information of the purchase history (the date and the product attribute values) corresponding to each customer, from the customer ID of the master data. In this way, the CPU 301 does not need to replace the attribute values for the information of the purchase history (the date and the product attribute values), by replacing the attribute values of the customer ID in the relation data. Therefore, the CPU 301 can decrease the processing load compared with the case where the attribute values for the information of the purchase history are replaced.

In addition, replacement of the attribute values is locally performed only in the relation data, and changes for the master data and the other relation data do not occur. Therefore, the usefulness of the target data is difficult to decrease. That is, the CPU 301 can also prevent a decrease in the usefulness of the target data by replacing the attribute values of the attribute in the relation data.

The replacement method of the attribute values of the customer ID in the relation data include, for example, a first method and a second method as described below.

The first method is a method of replacing the attribute values based on the customer ID value.

FIG. 12 is a diagram illustrating one example of target data after replacement of the attribute values of the customer ID in the relation data by the first method. The example in FIG. 12 shows the results of the replacements ((1→3), (2→1), (3→2)) for the customer ID. The row of the original customer ID1 corresponds to the row of the customer ID3, the row of the original customer ID2 corresponds to the row of the customer ID1, and the row of the original customer ID3 corresponds to the row of the customer ID2.

The second method is a method of adding ID having each different value to each row of the table of the relation data and replacing the attribute values of the customer ID based on the added customer ID. The history ID in FIG. 11 is one example of the ID added to the relation data.

FIG. 13 is a diagram illustrating one example of target data after replacement of the attribute values of the customer ID in the relation data by the second method. The example in FIG. 13 shows the result in which the replacements ((1→4), (2→3), (3→2), (4→1)) for the attribute values of the history ID is performed and the customer ID corresponding to each history ID are replaced, accordingly. In the example in FIG. 11, the history ID1 and ID2 correspond to the customer ID1, the history ID3 corresponds to the customer ID2, and the history ID4 corresponds to the customer ID3. Therefore, the customer ID is shown as 3, 2, 1, and 1 from below.

As shown in FIG. 13, the second method maintains the information indicating that the customer of the customer ID1 bought two articles. The CPU 301 may distinguish replacement methods of the attribute values depending on information required to be stored as the target data after anonymization. In such a way, the CPU 301 can further improve the usefulness of the target data after anonymization.

In the examples in FIG. 11 to FIG. 13, the master data of the target data is not anonymized. However, the CPU 301 may anonymize the master data accordingly.

In addition, even if the target data is a table in which the three or more relations are set, the CPU 301 can replace the attribute values based on the relation between each table.

The information processing device 300 can perform anonymization in combination with a anonymization method of replacing the attribute values described in this embodiment and the other anonymization methods (conversion of attribute values, adding and deleting a record, and the like). As described in this embodiment, the information processing device 300 may apply other anonymization methods to target data before or after replacement of the attribute values. Thereby, the information processing device 300 can further improve the security of the target data after anonymization.

The information processing device 300 can also perform, for example, a method of performing anonymization in replacement of the attribute values in the beginning without significantly lowering the usefulness, and further applying the other anonymization methods so as to further enhance the security.

As described above, the preferable embodiments of the present invention have been detailed, while the present invention is not limited to the particular embodiment according thereto.

For example, some or all of the function configurations of the above-mentioned information processing device 300 may be implemented as a hardware in the information processing device 300.

The invention claimed is:

1. An information processing device for enhancing security of data stored in a storage device, the stored data including a plurality of objects and including attribute values associated with each of the plurality of objects, the information processing device comprising:
   a processor configured to
      determine a replacement attribute from among a plurality of attributes corresponding to categories of the attribute values of the plurality of objects of the stored data; and
      perform a replacement of the attribute values of the determined replacement attribute by (i) replacing a first attribute value of the determined replacement attribute of a first object with a second attribute value of the determined replacement attribute of a second object and (ii) replacing the second attribute value with the first attribute value, wherein the first attribute value and the second attribute value are selected among the attribute values based on a useful index indicating a difference between the stored data before the replacement and after the replacement and based on a replacement limitation being a condition to be satisfied with respect to the replacement;
   wherein the processor continues to replace the attribute values until a security test is successful.

2. The information processing device according to claim 1, wherein the useful index is obtained based on a feature amount extracted from the stored data before the replacement and a feature amount extracted from the stored data after the replacement.

3. The information processing device according to claim 1, wherein the processor is further configured to obtain assumptive information being information assumed as known by a viewer of the stored data,
   wherein the processor is configured to determine the replacement attribute from among the plurality of attributes, based on the obtained assumptive information.

4. The information processing device according to claim 1, wherein the processor is further configured to obtain assumptive information being information assumed as known by a viewer of the stored data,
   wherein the processor is configured to determine the replacement limitation based on the obtained assumptive information, and to perform the replacement based on the useful index, and the determined replacement limitation.

5. The information processing device according to claim 1, wherein the replacement limitation is a limitation about a distance between the stored data before the replacement and the stored data after the replacement.

6. The information processing device according to claim 5, wherein the distance is defined as a number of the attribute values not being replaced before and after the replacement.

7. The information processing device according to claim 5, wherein the distance is defined as a minimum value of number of times attribute values of the replacement attribute are replaced.

8. The information processing device according to claim 1, wherein the replacement limitation is a limitation indicating that the replacement is to be performed on attribute values belonging to different groups.

9. The information processing device according to claim 1, wherein the processor is configured to use an optimization method to identify a replacement pattern of attribute values of the determined replacement attribute by minimizing the useful index as an objective function, and perform the replacement based on the identified replacement pattern.

10. The information processing device according to claim 1, wherein the processor is configured to perform the replacement based on a penalty value defined by the replacement limitation.

11. The information processing device according to claim 1, wherein the stored data is configured in a plurality of tables associated based on a common attribute among the objects of the stored data, and
    the processor is configured to determine the common attribute as the replacement attribute.

12. An information processing method for enhancing security of data stored in a storage device, the stored data including a plurality of objects and including attribute values associated with each of the plurality of objects, the information processing method comprising:
    determining a replacement attribute from among a plurality of attributes corresponding to categories of the attribute values of the plurality of objects of the stored data; and
    performing a replacement of the attribute values of the determined replacement attribute by (i) replacing a first attribute value of the determined replacement attribute of a first object with a second attribute value of the determined replacement attribute of a second object and (ii) replacing the second attribute value with the first attribute value, wherein the first attribute value and the second attribute value are selected among the attribute values based on a useful index indicating a difference between the stored data before the replacement and after the replacement and based on a replacement limitation being a condition to be satisfied with respect to the replacement;
    wherein the method comprises replacing other attribute values with each other until a security test is successful.

13. A non-transitory computer-readable recording medium that records a program for enhancing security of data stored in a storage device, the stored data including a plurality of objects and including attribute values associated with each of the plurality of objects, the program causing a computer to execute:

determining a replacement attribute, from among a plurality of attributes corresponding to categories of the attribute values of the plurality of objects of the stored data; and replacing performing a replacement of the attribute values of the determined replacement attribute by (i) replacing a first attribute value of the determined replacement attribute of a first object with a second attribute value of the determined replacement attribute of a second object and (ii) replacing the second attribute value with the first attribute value, wherein the first attribute value and the second attribute value are selected among the attribute values based on a useful index indicating a difference between the stored data before the replacement and after the replacement and based on a replacement limitation being a condition to be satisfied with respect to the replacement;

wherein the program causes the computer to replace other attribute values with each other until a security test is successful.

* * * * *